United States Patent
Lin et al.

(10) Patent No.: US 8,262,057 B2
(45) Date of Patent: Sep. 11, 2012

(54) FLOW CONTROLLED ACTUATOR APPARATUS FOR USE WITH SELF-CLOSING STOP VALVES

(75) Inventors: Chun Lin, McKinney, TX (US); Yin Zhuang, Shanghai (CN); Lu Cang, Shanghai (CN); Fan Jian Jun, Shanghai (CN)

(73) Assignee: Fisher Controls International, LLC, St. Louis, MO (US)

( * ) Notice: Subject to any disclaimer, the term of this patent is extended or adjusted under 35 U.S.C. 154(b) by 556 days.

(21) Appl. No.: 11/764,012

(22) Filed: Jun. 15, 2007

(65) Prior Publication Data

US 2008/0308161 A1 Dec. 18, 2008

(51) Int. Cl.
*F16K 31/12* (2006.01)
(52) U.S. Cl. ............ 251/58; 251/61; 251/263; 137/460; 137/496; 137/498
(58) Field of Classification Search ............... 251/58, 251/61, 251, 263; 137/513.3, 460, 493, 496–498, 137/501, 512.15, 512.4, 513.5, 517
See application file for complete search history.

(56) References Cited

U.S. PATENT DOCUMENTS

| | | | | |
|---|---|---|---|---|
| 824,425 A * | 6/1906 | Johnson | | 137/498 |
| 2,179,144 A * | 11/1939 | Buttner | | 137/517 |
| 2,318,962 A * | 5/1943 | Parker | | 137/514.5 |
| 2,450,446 A * | 10/1948 | Rupp | | 251/117 |
| 2,676,613 A * | 4/1954 | Baxter | | 137/513.3 |
| 3,164,359 A * | 1/1965 | Dyer et al. | | 251/68 |
| 3,844,312 A | 10/1974 | Sumner et al. | | |
| 3,872,884 A * | 3/1975 | Busdiecker et al. | | 137/498 |
| 4,044,791 A * | 8/1977 | McKenzie | | 137/493.9 |
| 4,073,311 A | 2/1978 | McGeachy | | |
| 4,174,731 A * | 11/1979 | Sturgis et al. | | 137/498 |
| 4,704,947 A * | 11/1987 | Schneider | | 91/518 |
| 4,896,696 A * | 1/1990 | Bradley et al. | | 137/513.3 |
| 5,215,113 A * | 6/1993 | Terry | | 137/460 |

(Continued)

FOREIGN PATENT DOCUMENTS

CH 543024 10/1973

(Continued)

OTHER PUBLICATIONS

Emerson Process Management—Fisher Controls International, Instruction Manual for Internal Valves Types C402. C421 & C427, 8 pages, (no date provided).

(Continued)

*Primary Examiner* — John Fristoe, Jr.
*Assistant Examiner* — Marina Tietjen
(74) *Attorney, Agent, or Firm* — Hanley, Flight & Zimmerman, LLC (57) ABSTRACT

An apparatus for operating a device such as a self-closing internal valve is disclosed. The apparatus includes a housing assembly having an internal chamber, a fluid inlet in fluid communication with the internal chamber, and an actuator stem extending from the housing assembly. The actuator stem is moveable in response to the addition or removal of a fluid into or out of the internal chamber. To control the flow rate of a fluid into and out of the internal chamber, the apparatus includes a fluid control valve in fluid communication with the fluid inlet of the housing assembly, wherein the fluid control valve is adapted to restrict the rate of fluid flow into the internal chamber of the housing assembly.

30 Claims, 7 Drawing Sheets

U.S. PATENT DOCUMENTS

| | | | | |
|---|---|---|---|---|
| 5,312,083 A | * | 5/1994 | Ekman | 251/149.1 |
| 5,462,081 A | * | 10/1995 | Perusek et al. | 137/498 |
| 5,465,751 A | * | 11/1995 | Newton | 137/498 |
| 5,474,105 A | * | 12/1995 | Able et al. | 137/462 |
| 6,546,839 B1 | * | 4/2003 | Jamra et al. | 91/443 |
| 7,140,386 B2 | * | 11/2006 | Avis et al. | 137/504 |
| 7,293,579 B2 | * | 11/2007 | Aardema et al. | 137/513.3 |
| 2006/0289816 A1 | * | 12/2006 | Weingarten | 251/31 |

FOREIGN PATENT DOCUMENTS

| | | |
|---|---|---|
| EP | 1106884 | 10/1974 |
| SU | 994843 | 2/1983 |

OTHER PUBLICATIONS

Rego Products, Product Catalog, 7 pages, (no date provided).

Emerson Process Management—Fisher Controls International, Instruction Manual for Internal Valves Types C407-10, 8 pages, (no date provided).

Emerson Process Management—Fisher Controls International, Instruction Manual for P326 Series Pneumatic Cylinder Actuators, 4 pages, (no date provided).

Haldex AB, Technical Specification for Actuators—Service Chamber Brakes, 1 page, (no date provided).

International Search Report corresponding to International Patent Application No. PCT/US2008/065396, mailed Sep. 19, 2008, 4 pages.

Written Opinion of the International Searching Authority corresponding to International Patent Application No. PCT/US2008/065396, mailed Sep. 19, 2008, 7 pages.

"PCT International Preliminary Report on Patentability," issued by the International Bureau in connection with International Application No. PCT/US2008/065396, on Dec. 30, 2009, 8 pages.

"The Notification of the First Office Action," issued by The State Intellectual Property Office of P.R. China, in connection with Chinese Patent Application No. 200880080340.3, on Oct. 26, 2010, 7 pages.

Austrian Examination Report, issued by the Austrian Examination Office in connection with Austrian application No. GCC/P/2008/11047, on Sep. 15, 2011, 4 pages.

Russian Inquiry, issued by The Federal Institute of Industrial Property in connection with Russian application No. 2009147170/06(067221), on May 14, 2012, 5 pages.

English Translation of Russian Inquiry, issued by The Federal Institute of Industrial Property in connection with Russian application No. 2009147170/06(067221), on May 14, 2012, 5 pages.

* cited by examiner

FLOW CONTROLLED ACTUATOR APPARATUS FOR USE WITH SELF-CLOSING STOP VALVES

FIELD OF THE DISCLOSURE

The present disclosure relates generally to flow controlled actuators and more particularly to flow control actuator apparatus for use with self-closing stop valves.

BACKGROUND

Internal, self-closing stop valves ("internal valves") have often been used as a main valve on small capacity pumping systems or in vapor return lines on trucks to provide vapor equalization. While typically designed for propane, butane, or NH3 tanks at ambient temperatures, the valves can be used with other compressed liquids and/or gases. Department of Transportation regulations generally require the use of an internal valve for each liquid or vapor discharge outlet on cargo tanks. For example, Department of Transportation regulations require certain cargo tanks transporting propane, anhydrous ammonia, and other liquid compressed gases to be equipped with passive emergency discharge control equipment that will automatically shut off the flow of product without human intervention within 20 seconds of an unintentional release caused by separation of a delivery hose.

A typical internal valve contains an excess flow function, or integrated excess flow valve, that will close when the flow exceeds an established flow rating. An internal valve installed on a cargo tank typically provides protection against the discharge of hazardous materials during an unloading operation in the event that a pump and/or piping attached to the internal valve is sheared off and/or otherwise breached. Similarly, an internal valve installed on a stationary tank will provide protection against the discharge of hazardous materials in the event that a pump and/or piping attached to the internal valve is sheared off and/or otherwise breached.

An internal valve often requires the use of a remote operating control system, such as for example, a cable control, and/or a powered actuator system. Typically, the operating linkage employed allows the operating lever to move between a fully closed position and a fully open position. In one example, a pneumatic actuator, such as a spring return brake actuator, may be used to remotely operate the internal valve. While these actuators provide for fast operation of the internal valves between the fully closed position and the fully open position, the uncontrolled movement allows less time for the valve to be in a mid-point or rapid bleed position and, thus, result in a longer time necessary to equalize pressure and allow the valve to open.

DETAILED DESCRIPTION

The following description of the disclosed embodiment is not intended to limit the scope of the invention to the precise form or forms detailed herein. Instead the following description is intended to be illustrative of the principles of the invention so that others may follow its teachings.

Figure 1:
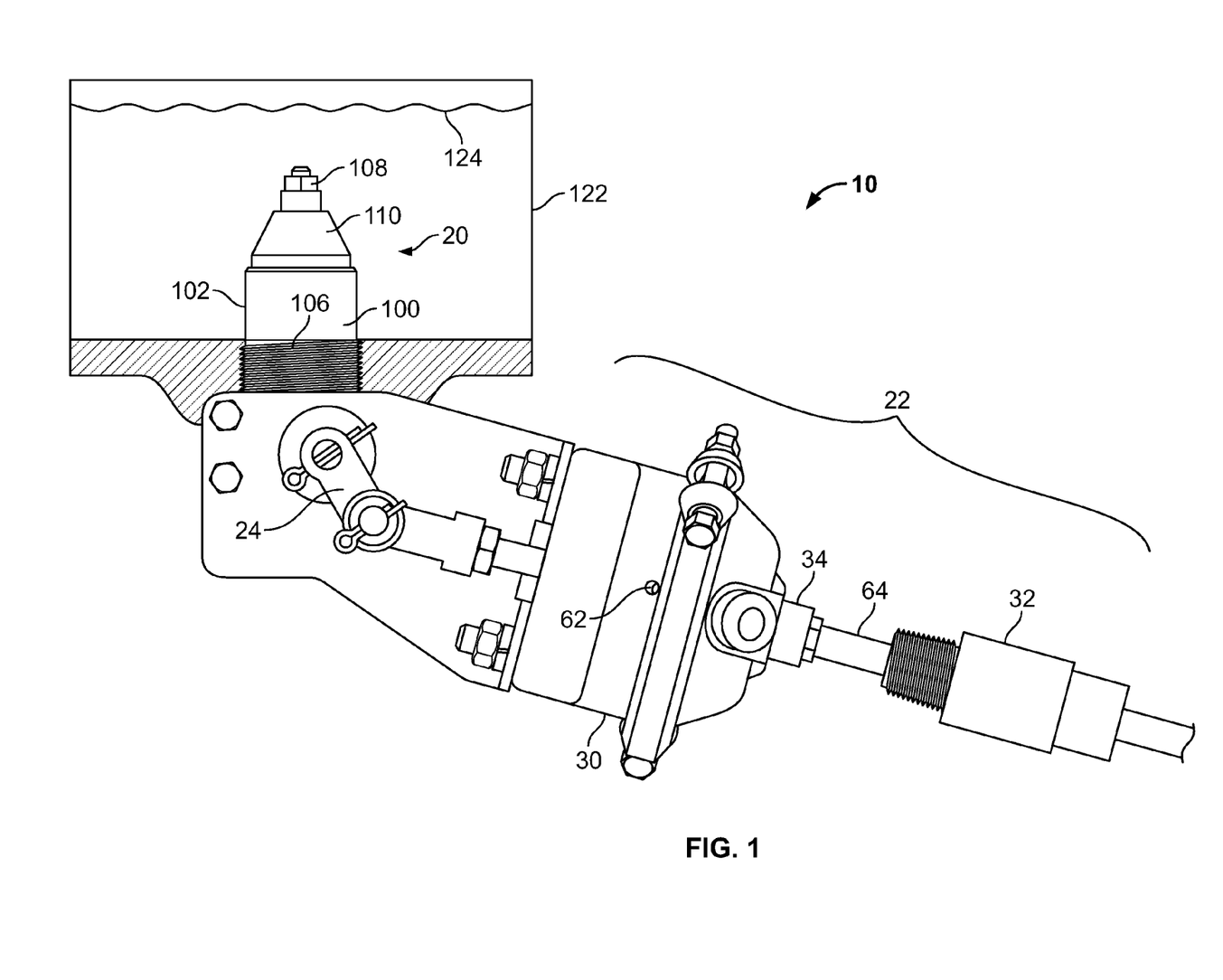
FIG. 1 is a front elevational view of a flow controlled actuator in use with an example self-closing stop valve.
Figure 2:
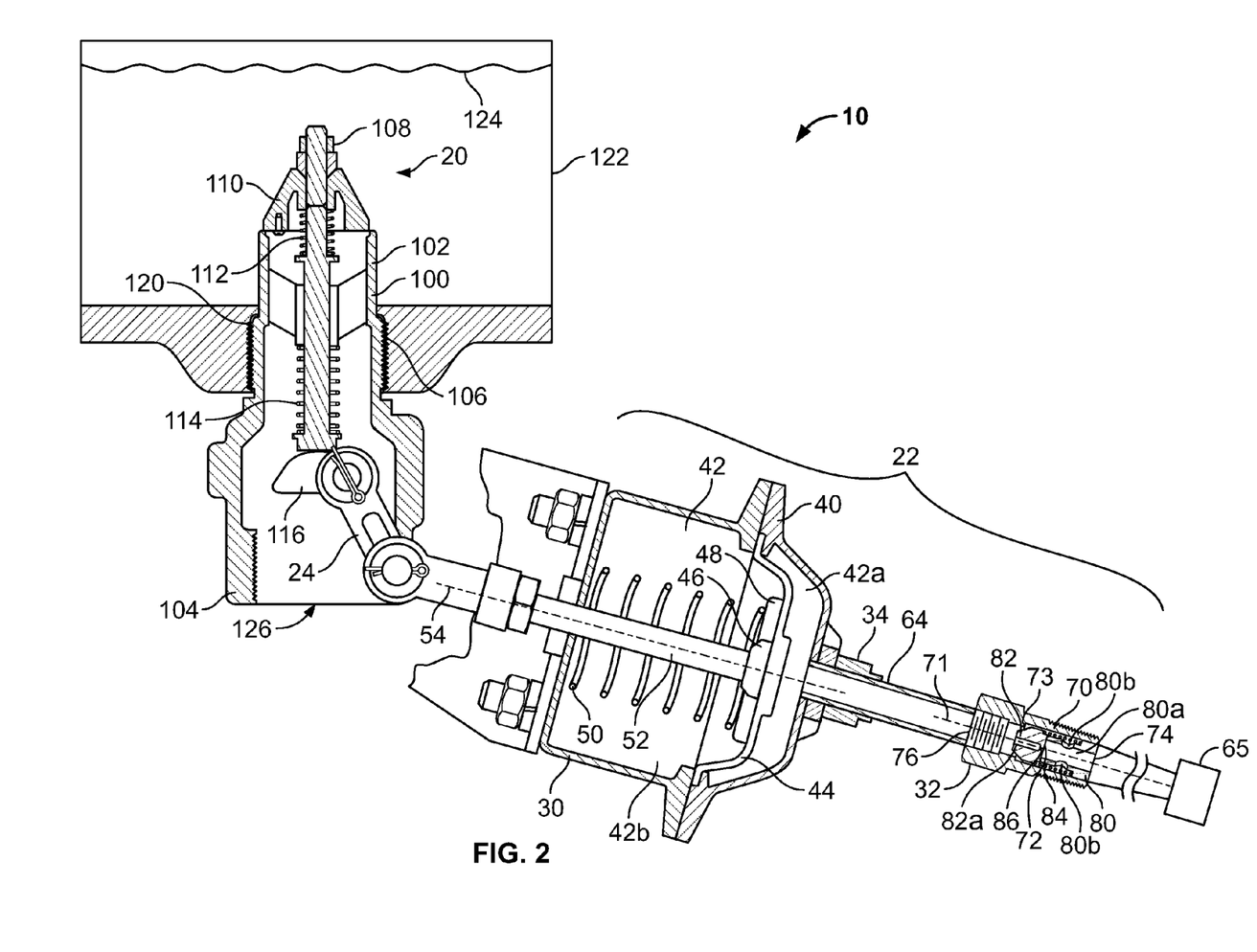
FIG. 2 is cross-sectional view of the example flow controlled actuator of FIG. 1 in use with the example self-closing stop valve, wherein the self-closing stop valve is in a closed position.

Referring now to the drawings, and specifically to FIGS. 1 and 2, there is illustrated an example remotely operated vapor equalization assembly 10. The example assembly 10 generally includes a self-closing stop valve, for example, an internal valve 20, operatively coupled to a flow controlled actuator 22. In this example, the flow controlled actuator 22 is coupled to an operating lever 24 of the valve 20 for operation of the valve 20 between at least a first operating position and a second operating position. The illustrated flow controlled actuator 22 includes a fluid actuator 30 (e.g., a pneumatic actuator) and a fluid control valve, such as for example, a limited relief valve 32 operatively coupled to an intake port 34 of the fluid actuator 30 to provide fluid flow control to the fluid actuator 30.

In this example, the valve 20 is a C-series type internal valve such as a C407-10 internal valve from Fisher® Controls International. It will be appreciated, however, that the valve 20 may be any suitable type of actuatable device including devices that are not valves. The example valve 20 includes a housing 100 having an upper portion 102 and a lower portion 104 which are separated by a threaded portion 106. The threaded portion 106 may be threadably engaged with a corresponding threaded aperture 120 of a tank 122 or other suitable storage vessel, thereby disposing the upper portion 102 of the valve 20 inside the tank 122. The tank 122 may contain a pressurized gas or liquid (i.e., a fluid) 124 to be delivered downstream to a destination through an outlet 126 of the valve 20. To facilitate the flow of the fluid from the tank 122, the example valve 20 includes an equalization member 108, a main poppet 110, an excess flow spring 112, and a closing spring 114, which opens and closes to allow the fluid 124 to flow through the valve 20 at varying flow rates. The valve 20 includes at least a first operating position and a second operating position in which the valve 20 is closed and opened, respectively. In this example, the valve 20 includes a third operative position, a rapid bleed position, approximately one-half way between the first and second operating positions. The valve operating position of the valve 20 may be selected by shifting the operating lever 24 to rotate a cam as described further below. Additionally, opening and closing the equalization member 108 and the main poppet 110 may be affected by the pressure differentials across the valve 20, as described further below.

As noted above, movement of the operating lever 24 may be affected by coupling the operating lever 24 to the flow controlled actuator 22. For example, movement of the operator lever 24 may be affected by operatively coupling the operating lever 24 to an output member of the flow controlled actuator 22 (e.g. an actuator stem) such that movement of the output member translates into movement of the operating lever 24. In the illustrated example, the fluid actuator 30 of the flow controlled actuator 22 is a service chamber brake actuator having a housing 40 defining a chamber 42. The chamber 42 is divided into a first chamber 42a and a second chamber 42b by a flexible diaphragm 44 including a stem seal 46, and a diaphragm plate 48. The flexible diaphragm 44 may be biased within the chamber 42 by, for example, a biasing element, such as a spring 50 extending between a wall of the chamber 42 and the diaphragm plate 48. The stem seal 46 holds an actuator stem 52 in fluid-tight relation to the diaphragm 44, and generally aligns the actuator stem 52 along a longitudinal axis 54 of the housing 40. The actuator stem 52 extends beyond the housing 40 to act as an output member and to operatively connect to the operating lever 24. Alternatively, the actuator stem 52 may be operatively coupled to connect to any number of mechanical linkages and/or devices and to perform a variety of desired operations.

The housing 40 defines at least one through-port, such as for example, the intake port 34, which is in fluid communication with the first chamber 42a, and at least one through-port 62, which is in fluid communication with the second chamber 42b. In this example, the open end of the intake port 34 is operatively coupled to the limited relief valve 32 through, for example, a fluid supply pipe 64. The limited relief valve 32 is, in turn, operatively coupled to an external fluid supply source 65, such as, for example, a high pressure pump. The fluid supplied by the external source 65 may be, for example, oil, water, air, and/or any other suitable fluid.

The example limited relief valve 32 of the flow controlled actuator 22 is a one-way flow valve with a limited bleed capability. In particular, the example limited relief valve 32 includes a housing 70 defining a through-bore 72 extending through the housing 70 along a longitudinal axis 71 and having an inlet port 74 and an outlet port 76. In this example, the longitudinal axis 71 of the valve 32 and the longitudinal axis 54 of the actuator 30 are co-axially aligned. The inlet port 74 is adapted to be coupled to the actuator operating fluid source 65 while the outlet port 76 is adapted to be coupled to the actuator 30 through the fluid supply pipe 64. It will be appreciated that while the limited relief valve 32, the actuator 30, and the fluid supply pipe 64 are illustrated as separate components, some or all of the components may be integrally manufactured as desired.

In this example, the limited relief valve 32 is designed to control the flow rate of fluid through the through-bore 72 in a direction from the inlet port 74 to the outlet port 76 while allowing essentially uncontrolled fluid flow in a direction from the outlet port 76 toward the inlet port 74.

To accomplish the fluid control, the limited relief valve 32 includes a reduced diameter portion or shoulder 73, a bleed seat 80, and a bleed disc 82 mounted within the through-bore 72. In particular, the bleed seat 80 is mounted within the through-bore 72 proximate the inlet port 74, while the bleed disc 82 is mounted within the through-bore 72 between the shoulder 73 and the bleed seat 80. In this example, the bleed disc 82 is movable within the through-bore 72 between the shoulder 73 and the bleed seat 80. Furthermore, the bleed disc 82 is biased toward the bleed seat 80 by a biasing element such as, for example, a spring 84.

The bleed seat 80 includes a plurality of apertures, such as, for example, a first aperture 80a extending through the bleed seat 80 generally coaxial to the longitudinal axis 71 of the through-bore 72, and a second aperture 80b extending through the bleed seat 80 generally transverse to the longitudinal axis 71 of the through bore 72. The bleed disc 82 includes an aperture 82a extending through the bleed disc 82 generally coaxial to the longitudinal axis 71 of the through-bore 72. In this example, the aperture 82a includes a reduced diameter portion, or restriction aperture 86 to control and/or reduce the flow rate of fluid through the aperture 82a.

Referring now particularly to FIGS. 2-6, the assembly 10 is shown in normal operation. In FIG. 2, the valve 20 is held in a first operating position such as a closed position, permitting a tight seal by both the tank pressure and the closing spring 114 of the valve 20. In particular, the tank pressure and the closing spring 114 bias both the equalization member 108 and the main poppet 110 toward the upper portion 102 of the valve 20, thus preventing flow through the valve 20.

Figure 3:
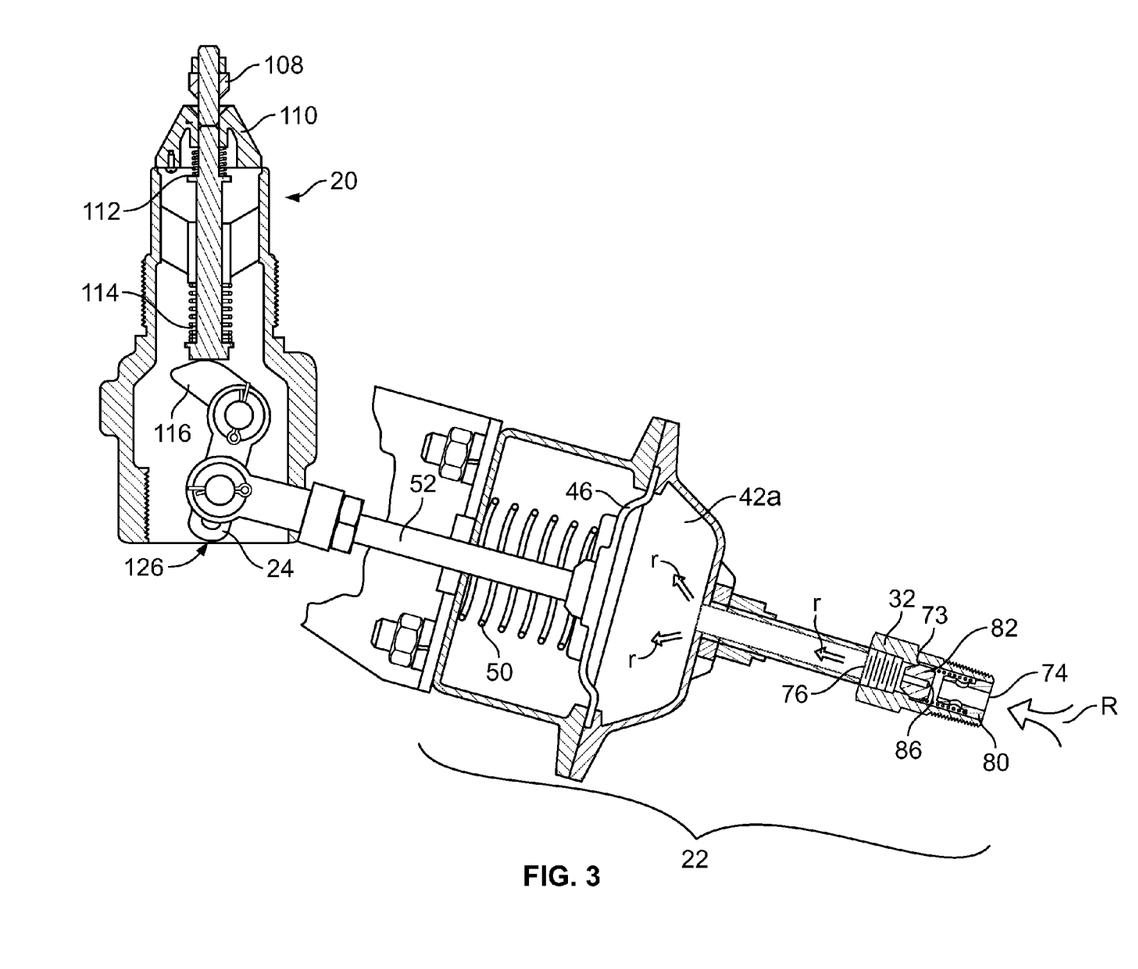
FIG. 3 is cross-sectional view of the example flow controlled actuator of FIG. 1 in use with the example self-closing stop valve, wherein the flow controlled actuator has moved the self-closing stop valve to a rapid bleed position.

In FIG. 3, the flow controlled actuator 22 is illustrated as being pressurized to move the operating lever 24 of the valve 20 to an intermediate operating position such as rapid bleed position, which allows pressure equalization between the tank, and the outlet 126. Specifically, in the illustrated example, a pressurized fluid is supplied to the inlet port 74 via the external supply source at a first flow rate R. The pressurized fluid enters the excess the limited relief valve 32 through the inlet port 74 and forces the bleed disc 82 toward the shoulder 73, thereby forcing the fluid to flow through the restriction aperture 86. This slows the rate of fluid flow beyond the restriction aperture 86 to result in a second flow rate of r at the outlet port 76. In this example, the second flow rate r is less than the first flow rate R and may be controlled or modified by the addition of other reduction apertures, by varying the biasing force of the spring 84, and/or by varying the size of the reduction aperture 86. The fluid then exits the limited relief valve 32 through the outlet port 76 and enters and pressurizes the chamber 42a, causing a force to be exerted upon the diaphragm 46. Once the pressure force is sufficient to overcome the biasing force of the spring 50 as well as the force of the spring 114 and any pressure force exerted on the top of the valve 20, the diaphragm 46 and the attached actuator stem 52 moves toward the actuated position illustrated. Moving the actuator lever 24 to the approximate mid-point allows the cam 116 to move the equalization member 108 to an opened position. This permits a larger amount of fluid 124 within the tank 122 to bleed downstream through the outlet 126 than if the operating lever 24 were initially moved directly into a fully open position as illustrated in FIG. 4.

Figure 4:
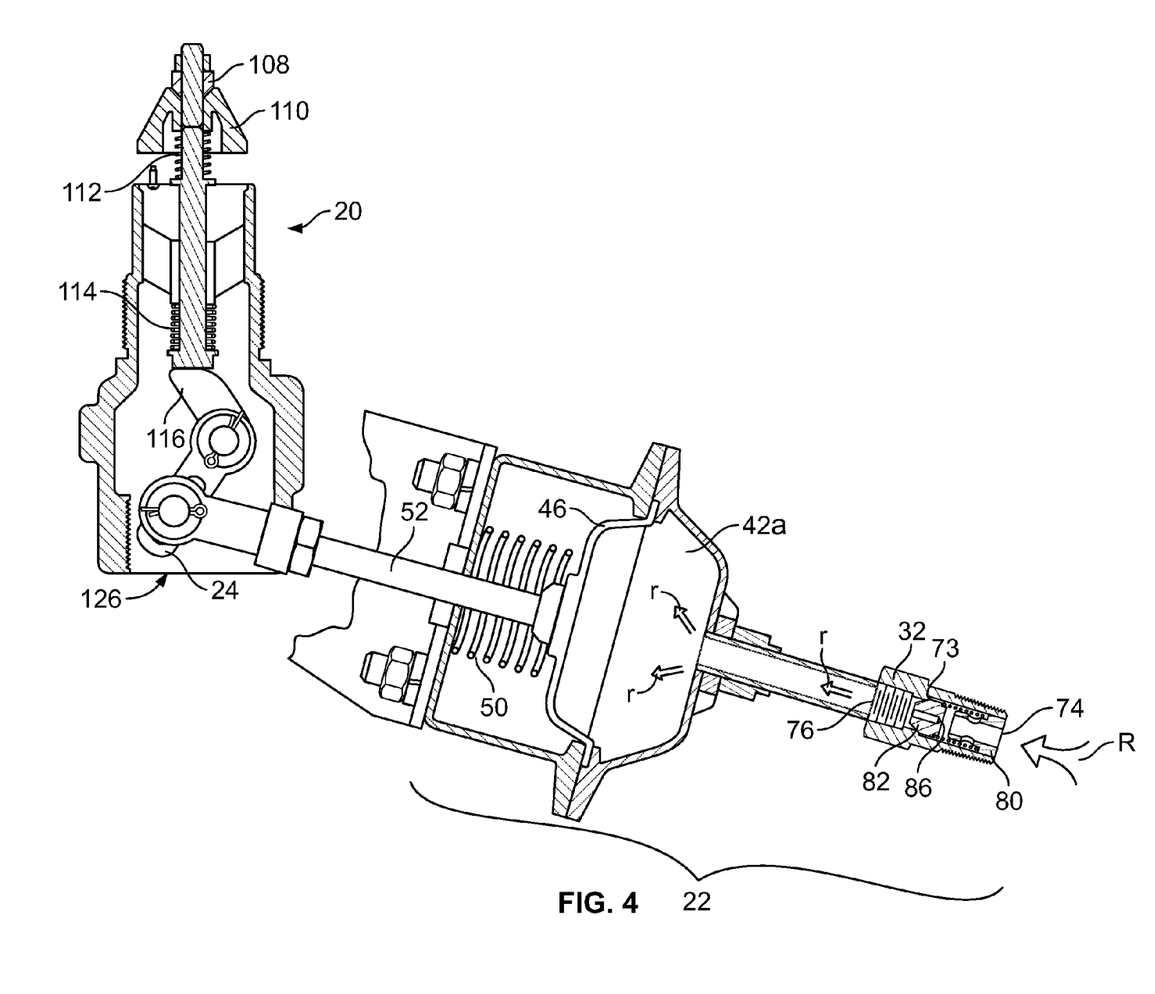
FIG. 4 is cross-sectional view of the example flow controlled actuator of FIG. 1 in use with the example self-closing stop valve, wherein the flow controlled actuator has moved the self-closing stop valve to an open position.

In FIG. 4, the flow controlled actuator 22 is illustrated as being pressurized to move the operating lever 24 of the valve 20 to a second operating position, or a fully opened position, which allows the fluid 124 within the tank 122 to flow downstream through the outlet 126. Specifically, in the illustrated example, the pressurized fluid continues to be supplied to inlet port 74 via the external supply source at the first flow rate R. The pressurized fluid continues to enter the limited relief valve 32 through the inlet port 74 and travels through the restriction aperture 86, thereby reducing the flow rate at the outlet port 76 to the second flow rate r and continues to increase pressure within the chamber 42a, causing the operating lever 24 to move toward the fully actuated position. In this position, when the tank 122 and the downstream pressure at the outlet 126 equalize, the excess flow spring 112 pushes open the main poppet 110 and the valve 20 is ready for transfer.

Figure 5:
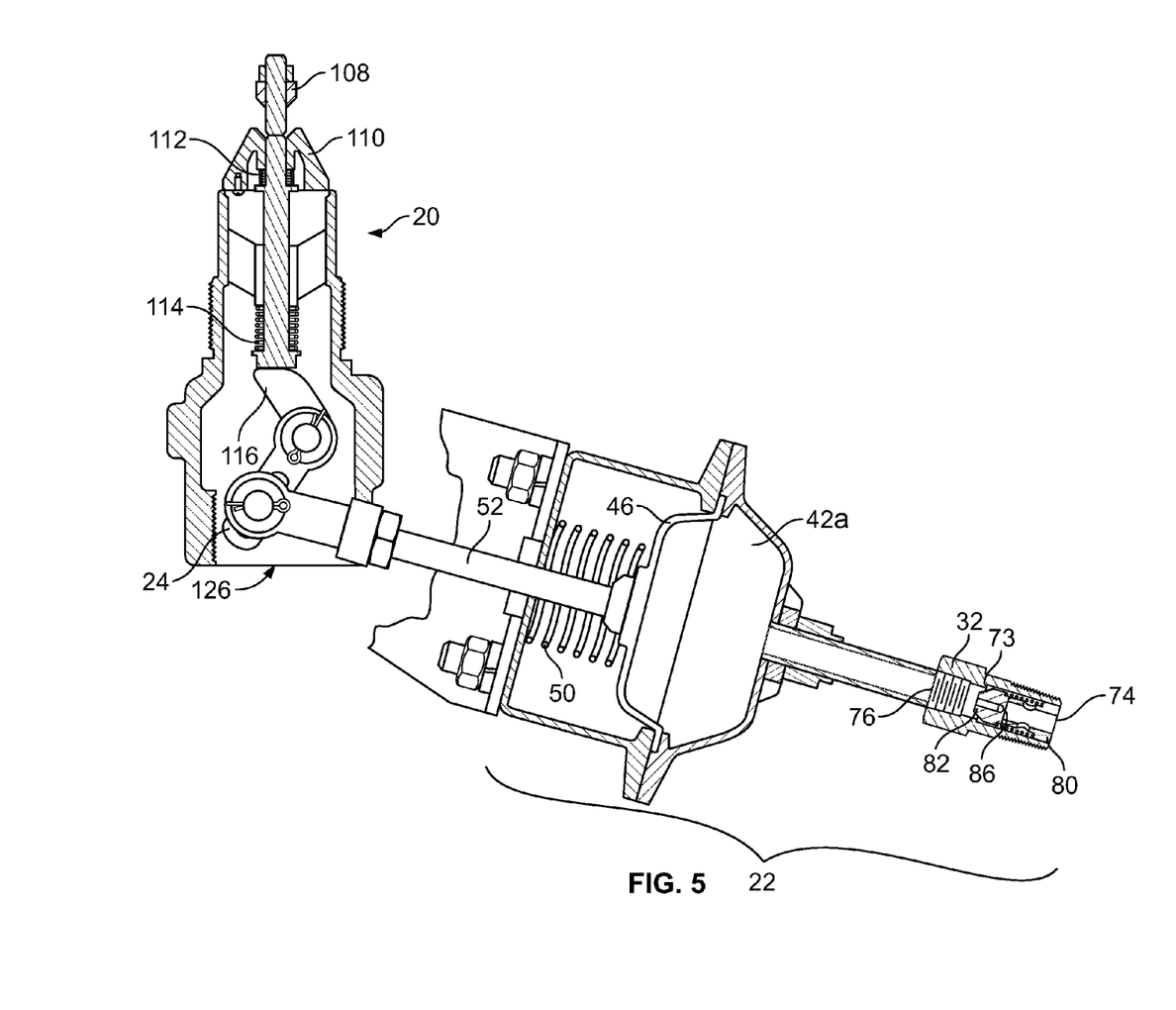
FIG. 5 is cross-sectional view of the example flow controlled actuator of FIG. 1 in use with the example self-closing stop valve, wherein the self-closing stop valve's operating position is in the fully open position and wherein the internal excess flow valve of the self-closing stop valve is closed.

In FIG. 5, the flow controlled actuator 22 is illustrated as being fully pressurized with the operating lever 24 of the valve 20 remaining in the fully open position. In this illustrated example, the pressure within the actuator 30 and the limited relief valve 32 are relatively constant, thereby holding the operating lever 24 in the fully actuated position. In this position, a flow, or flow surge by the fluid 124 through the valve 20 greater than the spring ratio of the excess flow spring 112 will force the main poppet 110 closed as illustrated. In this instance, a small amount of fluid 124 will continue to bleed downstream through the equalization member 108. Also in this instance, it is often desirable to return the valve 20 to its closed position as illustrated in FIGS. 2 and 6 to investigate and/or reset the transfer operation.

Figure 6:
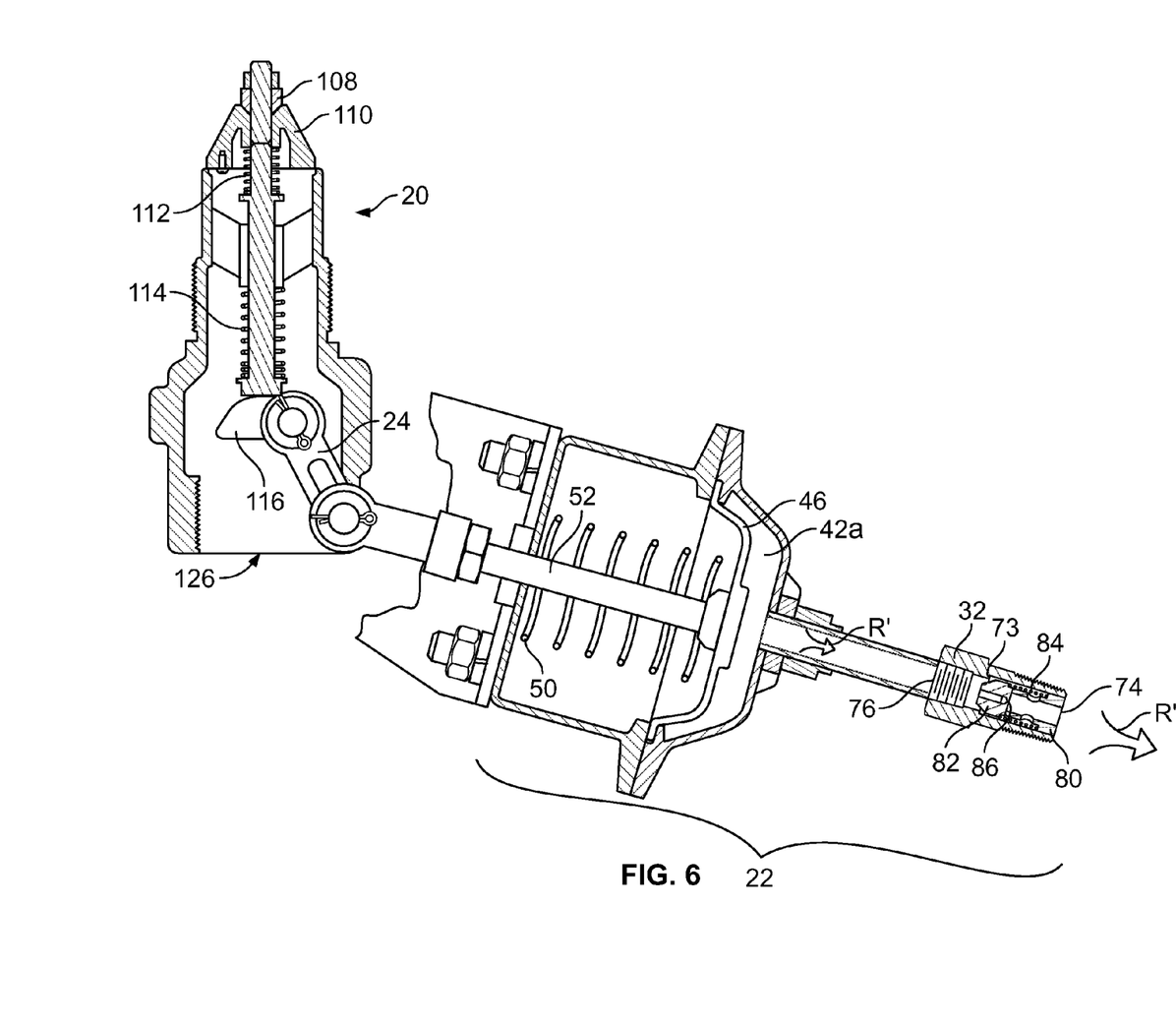
FIG. 6 is cross-sectional view of the example flow controlled actuator of FIG. 1 in use with the example self-closing stop valve, wherein the flow controlled actuator has moved the self-closing stop valve to a fully closed position.

In FIG. 6, the flow controlled actuator 22 is illustrated as being rapidly depressurized, thus returning the valve 20 to the fully closed position. In this example, the pressurized fluid source is either actively (e.g. via a pump) and/or passively (e.g. via a biasing force) removed from the flow controlled actuator 22, allowing the spring 50 to return the diaphragm 46 to its biased position. In particular, the spring 50 forces the fluid in the chamber 42a back through the outlet port 76 of the limited relief valve 32 producing a flow rate R' greater than the spring ratio of the spring 84 and forcing the bleed disc 82 toward the bleed seat 80. Once the bleed disc 82 is moved, the fluid is free to flow around the bleed disc 82 and out the inlet port 74, at the relatively high flow rate R' by avoiding the restriction aperture 86 of the bleed disc 82. In this manner, the actuator stem 52 may be rapidly moved thus returning the operating lever 24 to the fully closed position.

Figure 7:
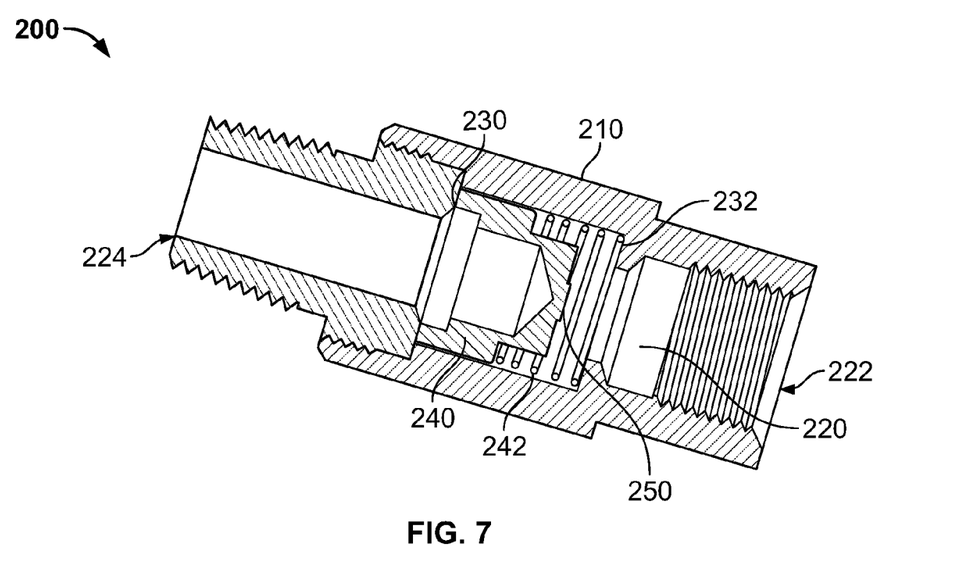
FIG. 7 is a cross-sectional view of another example fluid control valve which may be used in the flow control actuator of FIG. 1.

FIG. 7 illustrates another example fluid control valve that may be used in conjunction and/or instead of the limited relief valve 32. In particular, FIG. 7 illustrates an example excess flow valve 200. The excess flow valve 200 includes a housing 210 defining a through-bore 220 extending through the housing 210 and having an inlet port 224 and an outlet port 222. The inlet port is adapted to be coupled to the actuator operating fluid source 65, while the outlet port is adapted to be coupled to the actuator 30 through the fluid supply pipe 64. Again, while the excess flow valve 200, the actuator 30, and the fluid supply pipe 64 are illustrated as separate components, some and/or all of the components may be integrally formed as desired.

The excess flow valve 200 includes a first reduced diameter portion or shoulder 230 a second shoulder 232, and a seat 240 mounted within the through-bore 220 between the shoulders 230 and 232. The seat 240 is moveable between the two shoulders 230, 232 in response to pressure differentials between the inlet port 22 and the outlet port 224 and the seat 240 may be biased toward either shoulder 230, 232, as desired by a biasing element such as, for example, a spring 242. The seat 240 includes an aperture 250 extending through the seat 240. Similar to the limited relief valve 32, in operation, the seat 240 may shift toward the shoulder 232 during actuation of the operating lever 24 from the closed position to the open position to reduce the rate of fluid flow into the actuator 30 through a limited bleed hole or gap (not shown) between the shoulder 232 and the seat 240 to allow a limited flow through the excess flow valve 200 which will slow down the actuation from close to open position. Similarly, the seat 240 may shift toward the shoulder 230 during the return of the operating lever 24 from the open position to the closed position to allow for essentially uncontrolled fluid flow out of the actuator 30.

While the flow controlled actuator 22 is illustrated as coupled to the valve 20, it will be appreciated by one of ordinary skill in the art that the flow controlled actuator 22 may be utilized in conjunction with any number of devices that require a controlled flow actuation. Furthermore, while the illustrated actuator 22 is shown with a controlled inlet flow rate and a relatively uncontrolled outlet flow rate, it will be understood that the flow rates in either or both of the inlet and outlet directions may be controlled or uncontrolled as desired.

Although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What is claimed is:

1. An apparatus comprising:
a housing assembly having an internal chamber, a fluid inlet in fluid communication with the internal chamber, and an actuator stem extending from the housing assembly, wherein the actuator stem is moveable in response to the addition or removal of a fluid into or out of the internal chamber; and
a fluid control valve in fluid communication with the fluid inlet of the housing assembly, wherein the fluid control valve comprises a movable flow control element having an aperture therethrough, wherein the movable flow control element is to move between a first position against a first sealing surface at which fluid flows from the fluid inlet to the internal chamber through the aperture at a first flow rate and a second position against a second sealing surface opposite the first sealing surface at which fluid flows from the internal chamber to the fluid inlet adjacent an outer surface of the flow control element and through two or more apertures of the second sealing surface at second flow rate, wherein the second flow rate is substantially greater than the first flow rate.

2. An apparatus as defined in claim 1, wherein the fluid control valve is integrally formed with the housing assembly.

3. An apparatus as defined in claim 1 further comprising an actuator comprising a diaphragm to divide the internal chamber into a first chamber in fluid communication with the fluid inlet and a second chamber having the actuator stem extending therethrough.

4. An apparatus as defined in claim 3, wherein the diaphragm is biased toward the fluid inlet.

5. An apparatus as defined in claim 4, wherein the diaphragm is biased via a spring.

6. An apparatus as defined in claim 1, further comprising a self-closing stop valve having an operating lever operatively coupled to the actuator stem.

7. An apparatus as defined in claim 1, wherein the fluid control valve is an excess flow valve.

8. An apparatus as defined in claim 1, wherein the fluid control valve is a limited relief valve.

9. An apparatus as defined in claim 1, wherein the flow control valve further includes at least one of a first reduced diameter portion, a second reduced diameter portion, a seat or a disc.

10. An apparatus as defined in claim 9, wherein the seat is the movable flow control element and is movable between the first and second reduced diameter portions.

11. An apparatus as defined in claim 9, wherein the disc is the movable flow control element and is movable between the first reduced diameter portion and the seat.

12. An apparatus as defined in claim 9, wherein the seat includes a plurality of apertures.

13. An apparatus as defined in claim 12, wherein at least one aperture is generally coaxial to a longitudinal axis of the internal chamber and at least one aperture is generally transverse to the longitudinal axis of the internal chamber.

14. An apparatus as defined in claim 1, wherein, in the first flow rate is a relatively restricted flow rate and the second flow rate is a relatively unrestricted flow rate.

15. An apparatus as defined in claim 14, wherein the second flow rate is relatively unrestricted regardless of the magnitude of the second flow rate.

16. An apparatus as defined in claim 1, wherein a spring to bias the movable flow control member surrounds the second sealing surface.

17. An apparatus as defined in claim 16, wherein fluid flowing from the internal chamber to the fluid inlet flows around the spring and through one or more transverse passages adjacent the second sealing surface.

18. An apparatus as defined in claim 1, wherein the first sealing surface comprises a shoulder and the second sealing surface comprises a bleed seat.

19. A fluid control apparatus comprising:
a self-closing stop valve having a first operating position, a second operating position and a rapid bleed position between the first and second operating positions; and
an actuator assembly adapted to shift the self-closing stop valve between the first operating position and the second operating position, wherein the actuator assembly comprises:
a housing assembly having an internal chamber, a fluid inlet in fluid communication with the internal chamber, and an actuator stem extending from the housing assembly, wherein the actuator stem is moveable in response to the addition or removal of a fluid into or out of the internal chamber; and
a fluid control valve in fluid communication with the fluid inlet of the housing assembly, wherein the fluid control valve comprises a movable flow control element having an aperture therethrough, wherein the movable flow control element is to move between engagement with a first internal seat of the fluid control valve at which fluid flows from the fluid inlet to the internal chamber of the housing assembly at a first flow rate and engagement with a second internal seat of the fluid control valve at which fluid flows from the internal chamber of the housing assembly to the fluid inlet adjacent an outer surface of the flow control element and through a side aperture of the second internal seat, at a second flow rate, wherein the second flow rate is different than the first flow rate and wherein the side aperture is orthogonal to a longitudinal axis of the second internal seat.

20. A fluid control apparatus as defined in claim 19, wherein the actuator assembly shifts the self-closing stop valve from the first operating position to the second operating position at a rate slower than the actuator assembly shifts the self-closing stop valve from the second operating position to the first operating position.

21. A fluid control apparatus as defined in claim 19, wherein the fluid control valve is integrally formed with the housing assembly.

22. A fluid control apparatus as defined in claim 19, wherein the actuator assembly comprises a diaphragm to divide the internal chamber into a first chamber in fluid communication with the fluid inlet and a second chamber having the actuator stem extending therethrough.

23. A fluid control apparatus as defined in claim 22, wherein the diaphragm is biased toward the fluid inlet.

24. A fluid control apparatus as defined in claim 19, further comprising an operating lever adapted to shift the self-closing stop valve between the first operating position and the second operating position.

25. A fluid control apparatus as defined in claim 24, wherein the operating lever is operatively coupled to the actuator stem.

26. A fluid control apparatus as defined in claim 19, wherein the first flow rate is substantially less than the second flow rate.

27. A fluid control apparatus as defined in claim 19, wherein the fluid control valve is an excess flow valve.

28. A fluid control apparatus as defined in claim 19, wherein the fluid control valve is a limited relief valve.

29. An apparatus comprising:
a housing assembly having an internal chamber, a fluid inlet in fluid communication with the internal chamber, and an actuator stem extending from the housing assembly, wherein the actuator stem is moveable in response to the addition of a fluid into or the removal of fluid from the internal chamber; and
a fluid control valve in fluid communication with the fluid inlet of the housing assembly, wherein the fluid control valve comprises:
a control valve housing having an interior surface including a first internal diameter, a first shoulder defining a first sealing surface having a second internal diameter smaller than the first internal diameter, and a second shoulder defining a second sealing surface having two apertures at least one of which defines a third internal diameter smaller than the second internal diameter; and
a movable flow control element having an aperture therethrough, wherein the movable flow control element is to move between a first position aligned with the first shoulder and a second position aligned with the second shoulder.

30. An apparatus as defined in claim 29, wherein fluid flows through the control valve at a first rate in the first position and at a second rate in the second position.

* * * * *